S. E. PARRISH.
Car Wheel.
No. 19,380.
Patented Feb. 16, 1858.
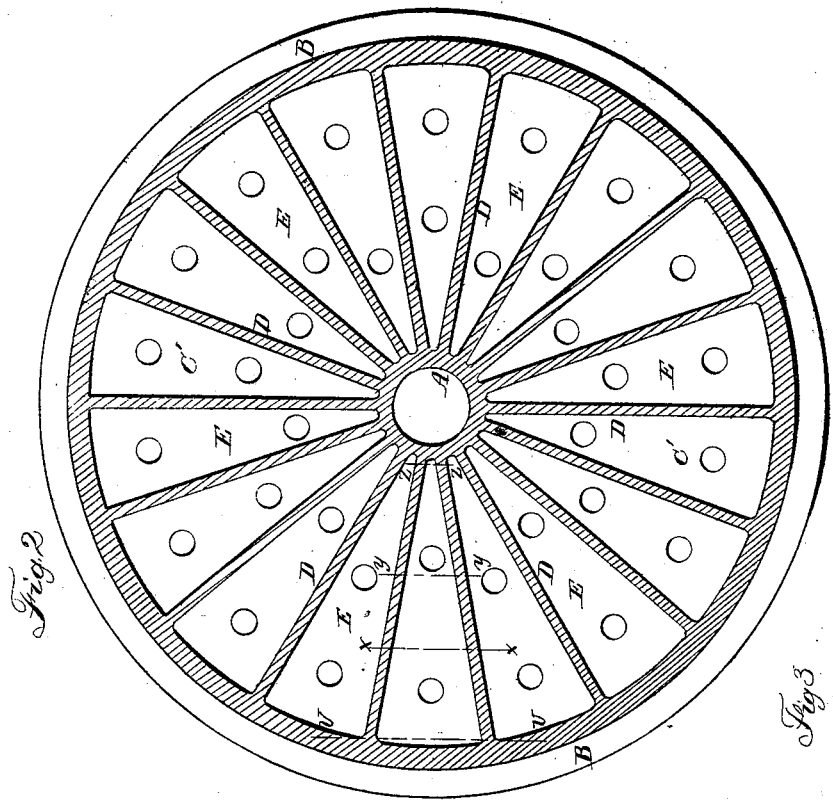
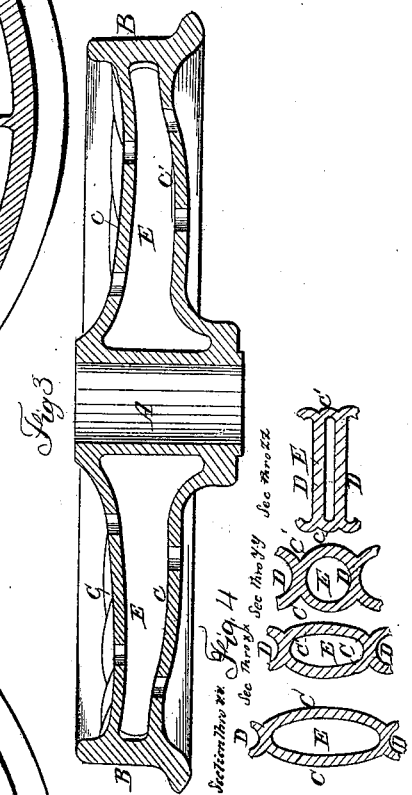
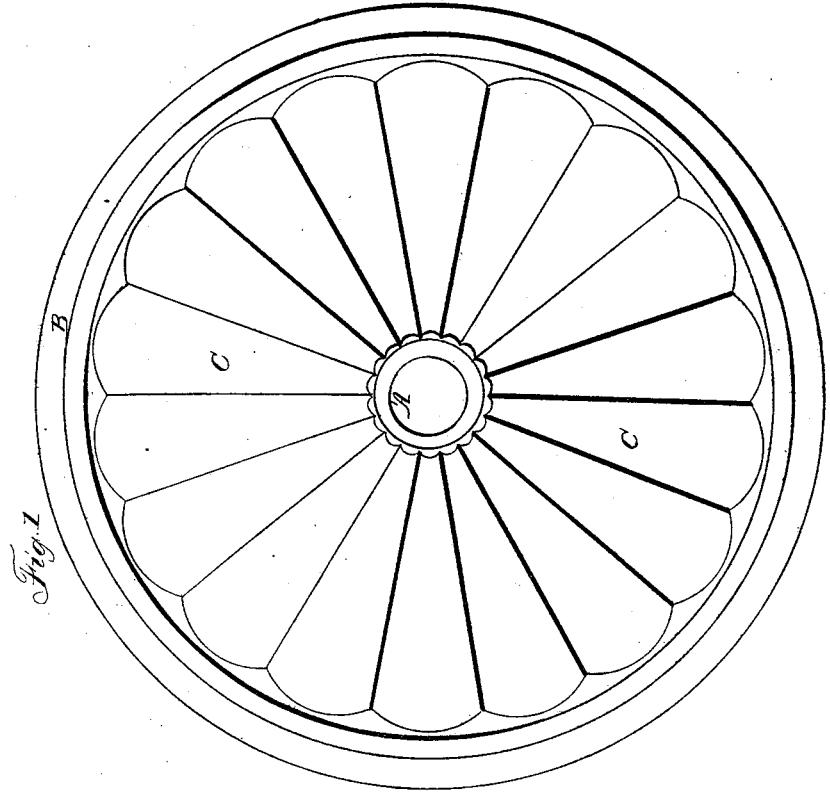

UNITED STATES PATENT OFFICE.

STEPHEN E. PARRISH, OF NASHVILLE, TENNESSEE.

RAILROAD-CAR WHEEL.

Specification of Letters Patent No. 19,380, dated February 16, 1858.

*To all whom it may concern:*

Be it known that I, STEPHEN E. PARRISH, of Nashville, in the county of Davidson and State of Tennessee, have invented a new and useful Improvement in Railroad-Wheels; and I do hereby declare that the following is a full, clear, and exact description of the same, reference being had to the accompanying drawings, forming part of this specification, in which—

Figure 1, is a face view of a wheel constructed according to my invention. Fig. 2, is a section of the same perpendicularly to the axis. Fig. 3, is a central section of the same on a plane passing through the axis. Fig. 4, represents sections of one of the radial chambers C, of the wheel at the places indicated by the red lines (v) (v) (x) (x) (y) (y) and (z) (z) in Fig. 2.

Similar letters of reference indicate corresponding parts in the several figures.

This improvement consists in connecting the hub and rim by means of two plates having corresponding radial corrugations, said plates being cast with the hub and rim and their several corrugations being united together in the casting so as to form a series of radial chambers of the form hereinafter described in the interior of the wheel.

A, (Figs. 1, 2 and 3) is the hub of the wheel.

B is the rim.

C, C′, are the radially corrugated plates uniting the hub and the rim.

D, D, (Figs. 2 and 4) are the radial connections of the corrugated plates C, C′; and E, E, are the separate chambers formed by the said connections D, D, between the plates C C′.

The plates C, C′, are curved as shown in Fig. 2, in any manner considered best calculated to prevent cracking in the cooling of the casting, but their distance apart is made much greater near the hub than near the rim in order to give stiffness to the wheel as will be understood by a comparison of the sections in Fig. 4, with the red lines in Fig. 2, which indicate where they are taken.

This construction of the wheel with two radially corrugated plates united, so as to form radial chambers, combines great strength with lightness and provides for the shrinkage of the wheel in cooling, and experiment proves it to be stronger in proportion to its weight than most of the wheels in use.

What I claim as my invention and desire to secure by Letters Patent, is—

A car wheel made substantially as herein shown and described, viz:—the hub and rim connected by means of two plates having corresponding radial corrugations, said plates being cast with the hub and rim and their several corrugations being united together so as to form a series of radial chambers within the wheel, as and for the purposes set forth.

S. E. PARRISH.

Witnesses:
ANSON NELSON,
V. B. HOLMAN.